US006054994A

United States Patent [19]

Becker et al.

[11] Patent Number: 6,054,994

[45] **Date of Patent: *Apr. 25, 2000**

[54] PROCESS FOR DEPICTING OBJECTS USING AN IMAGE REPRODUCTION DEVICE

[75] Inventors: Klaus Becker, Weiterstadt; Detlef Haase, NeuAnspach, both of Germany

[73] Assignee: VDO Luftfahrtgeraete Werk GmbH, Frankfurt am Main, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/860,198

[22] PCT Filed: Dec. 21, 1995

[86] PCT No.: PCT/DE95/01854

§ 371 Date: Jun. 20, 1997

§ 102(e) Date: Jun. 20, 1997

[87] PCT Pub. No.: WO96/20469

PCT Pub. Date: Jul. 4, 1996

[30] Foreign Application Priority Data

Jan. 25, 1996 [DE] Germany ........................... 195 16 090

[51] Int. Cl.[7] ...................................................... G06T 11/00

[52] U.S. Cl. ............................................ 345/431; 345/440

[58] Field of Search .................................... 345/431, 186, 345/508, 510, 440, 441

[56] References Cited

U.S. PATENT DOCUMENTS

| | | | |
|---|---|---|---|
| 5,299,301 | 3/1994 | Nohmi et al. | 345/431 |
| 5,594,850 | 1/1997 | Noyama et al. | 345/435 |
| 5,798,766 | 8/1998 | Hayashi et al. | 345/431 |
| 5,808,627 | 9/1998 | Kelley et al. | 345/441 |

*Primary Examiner*—Mark R. Powell
*Assistant Examiner*—Huedung X. Cao
*Attorney, Agent, or Firm*—Milde, Hoffberg & Macklin, LLP

[57] ABSTRACT

In a process for depicting objects using an image reproduction device, data that describe the form and position of objects are fed into at least one image memory. The data are read out line by line and, along with other data describing the other properties of the objects, processed to form video signals which are fed to the image reproduction device.

20 Claims, 10 Drawing Sheets

| RA | | | | | | | | TL | AD |
|---|---|---|---|---|---|---|---|---|---|
| (7) | (6) | (5) | (4) | (3) | (2) | (1) | (0) | (3.0) | (1) |
| 0 | 0 | 0 | 0 | 0 | 0 | 0 | 0 | 0000 | 0 |
| 0 | 0 | 0 | 0 | 0 | 0 | 0 | 1 | 0001 | 1 |
| 0 | 0 | 0 | 0 | 0 | 0 | 1 | X | 0010 | 1 |
| 0 | 0 | 0 | 0 | 0 | 1 | X | X | 0011 | 1 |
| 0 | 0 | 0 | 0 | 1 | X | X | X | 0100 | 1 |
| 0 | 0 | 0 | 1 | X | X | X | X | 0101 | 1 |
| 0 | 0 | 1 | X | X | X | X | X | 0110 | 1 |
| 0 | 1 | X | X | X | X | X | X | 0111 | 1 |
| 1 | X | X | X | X | X | X | X | 1000 | 1 |

Fig.4

| RA | | | | | | | | AC | | | | | | | | | | | | AF | | | | |
|---|---|---|---|---|---|---|---|---|---|---|---|---|---|---|---|---|---|---|---|---|---|---|---|---|
| | | | | | | | | R | | | | G | | | | B | | | | | | | | |
| 1 | 0 | 0 | 0 | 0 | 0 | 0 | 0 | 1 | 1 | 1 | 1 | 0 | 0 | 0 | 0 | 0 | 0 | 0 | 0 | 0 | 0 | 1 | 1 | a |
| 0 | 1 | 0 | 0 | 0 | 0 | 0 | 0 | 0 | 0 | 0 | 0 | 1 | 1 | 1 | 1 | 0 | 0 | 0 | 0 | 1 | 1 | 1 | 1 | b |
| 0 | 0 | 1 | 0 | 0 | 0 | 0 | 0 | 0 | 1 | 1 | 1 | 0 | 1 | 1 | 1 | 0 | 0 | 0 | 0 | 0 | 0 | 1 | 1 | c |
| | ⋮ | | | | | | | | ⋮ | | | | ⋮ | | | | ⋮ | | | | ⋮ | | | |
| 1 | 0 | 1 | 0 | 0 | 0 | 0 | 0 | 1 | 0 | 1 | 1 | 0 | 0 | 1 | 1 | 0 | 0 | 0 | 0 | 0 | 1 | 1 | 1 | d |
| 0 | 1 | 1 | 0 | 0 | 0 | 0 | 0 | 0 | 0 | 0 | 0 | 1 | 1 | 1 | 1 | 0 | 0 | 0 | 0 | 1 | 1 | 1 | 1 | e |
| | ⋮ | | | | | | | | ⋮ | | | | ⋮ | | | | ⋮ | | | | ⋮ | | | |

Fig.5

Y2<Y3 & Y1=Y3 NI

G12

Y2>Y3 & Y1=Y3 NI

G13

Y1=Y2=Y3 & X2<X1 & X2>X3 R

G14

Y1=Y2=Y3 & X2>X1 & X2<X3 R

G15

Y1=Y2=Y3 & X2>X1 & X2>X3 S

G16

Y1=Y2=Y3 & X2<X1 & X2<X3 S

PROCESS FOR DEPICTING OBJECTS USING AN IMAGE REPRODUCTION DEVICE

This invention relates to a procedure for displaying objects using an image reproduction device.

Image reproduction devices are increasingly being used for displaying information which exists in the form of data and which is made visible as two-dimensional objects using the resources of what is termed computer graphics. Thus display devices for aircraft have become known, for example, in which various symbols are displayed on a screen and indicate the most important information to the pilot in a clear manner. A display of this type is described in U.S. Pat. No. 5,420,582, for example.

In the known procedures for the display of two-dimensional objects using an image reproduction device, the contour of an object is first calculated in each case. Thereafter, all the image elements which are situated inside the calculated contour are written to an image memory with the requisite information for the respective color of the object. In order to obtain the signals required for the image reproduction device (video signals), the image memory is then read line by line. Depending on the desired local resolution and the resolution in the plane of colour, image memories of considerable capacity are necessary for such procedures. Moreover, a relatively large amount of data has to be processed when writing to and reading from memory, which either necessitates very fast circuits or results in a restriction of the display of rapidly moving objects.

Particularly when displaying information by means of objects which are situated in different planes and which may be both two-dimensional or linear, considerable computational effort is necessary for preparing the graphic data before writing them to the image memories. Thus, for example, all the objects involved have to be recalculated if an object moves over the boundaries of one or more other objects. For this purpose, a computational capacity has to be made available which is higher the more rapidly the modifications are to be made.

The object of the present invention is to provide a procedure for displaying objects using an image reproduction device in which a multiplicity of displays which is as large as possible and a high rate of modification can be achieved with a given computer output.

This object is achieved according to the invention in that data which describe the shape and position of the objects are fed in and are stored in at least one image memory, that the data are read out line by line and are processed with further data which are fed in and which describe further properties of the objects to form video signals which are fed to the image reproduction device.

Processing to form image signals is preferably effected in that the further data which describe further properties of the objects are written to at least one further memory, that the data which describe the shape and position and which are read out are fed as addresses to the at least one further memory, and that the further data are read out as digital video signals under the addresses from the at least one further memory.

By means of the procedure according to the invention, a plurality of objects can be moved rapidly and independently of each other on the screen of the image reproduction device, without a complete recalculation of the image being necessary in each phase of movement. For example, in order to produce an artificial horizon on a screen, a multiplicity of scales and markings are necessary on the screen in addition to the blue area of the sky and the mainly brown area of the earth. In this respect, for example, the brown area of the earth represents an object which is situated inside the oval visible region in front of the blue area of the sky. If it is only the artificial horizon which alters, due to a rolling or pitching movement of the aircraft for example, a graphic processor connected upstream merely has to recalculate the new form or position of the "brown area" object. All the other data which possibly influence the display of this object can be left unchanged.

The procedure according to the invention also has the advantage that the requisite storage capacity is significantly reduced compared with the storage of the complete image of the object. In a conventional storage procedure it is necessary to store an amount of information corresponding to the colour resolution for each image element of the object. In the procedure according to the invention this amount of information is only stored once.

A development of the procedure according to the invention consists of mixing the digital video signals with further digital video signals which are fed in. A background can thereby be placed underneath the display of objects produced by the procedure according to the invention. This background may be a map, for example, and the objects to be displayed may be flight information, such as radio beacons, air corridors, aircraft symbols and alphanumeric data. The further digital video signals which are fed in may also be generated using a further device according to the procedure according to the invention. Thus it is possible, for example, to generate symbols, scales and pointers with a first device and to place these underneath an image of a landscape provided with a second device, or to cascade a plurality of image-producing units in order to superimpose different types of symbols.

Another development of the procedure according to the invention consists of storing data which describe the shape and position of line objects in a first image memory and storing data which describe the shape and position of two-dimensional objects in a second image memory, wherein the data read out from the image memories are fed as addresses to a first and a second further memory in each case. A different treatment of two-dimensional and line objects which is matched to the respective requirements is thus possible.

Although the further properties may be any properties of the objects, provision is preferably made in the procedure according to the invention for the further properties of the objects to be the colour and transparency thereof. Further attributes may be flashing displays, hatching for two-dimensional objects and broken lines for line objects, for example.

In another development of the procedure according to the invention, the data which describe the shape and position comprise a plurality of bit positions for each image element and each bit position is assigned to a display plane, particularly to an object to be displayed in this display plane. In this respect, the further data for each address can preferably be fed in independently and can be stored in the further memories.

With this further development, any colours can be assigned to the individual objects and to those areas on which the objects overlap. These colours can also be changed during the display, for example image by image. This can be effected with the procedure according to the invention without the graphic processor having to recalculate the object as such—namely its shape and position.

A separate treatment of line and two-dimensional objects has proved to be particularly advantageous in the procedure according to the invention, in that digital video signals which represent the colour of the line objects and digital video signals which represent the colour of two-dimensional objects are each mixed with a background signal using a transparency factor, and that the mixed products are mixed with each other using a further factor which describes the line intensity. In this respect, the factor which describes the line intensity preferably falls off gradually from the middles of the lines to their edges in order to avoid foldover distortions.

For the mixed display of line and two-dimensional objects in a plurality of planes, it is necessary to adapt the lines, as regards their colour and priority, to the other objects. It is thus necessary, for example, to interrupt a line if it is situated in part behind a non-transparent two-dimensional object. Adaptations of this type can advantageously be achieved with the procedure according to the invention in that the data which describe the shape and position comprise a plurality of bit positions for each image element, that a bit position is assigned to each display plane, particularly to an object to be displayed in this display plane, that signals which can be taken from the first further memory and which indicate the plane of the respective line object are compared with the data read out from the second image memory, and that the digital video signals representing the lines are replaced by digital video signals which represent objects for those image elements for which the comparison shows that a line runs behind an object.

In order to store the data which describe the shape and the position of each object, an image memory can be used which is known in the art and which only comprises 1 bit per image element. According to another development, it is possible to reduce this storage requirement by

- deriving coordinates of the image elements which form the contour from the data fed in which each describe the shape and position of an object,
- writing the coordinates to a first memory,
- feeding in the further data fed in, which describe further properties of the respective object, and storing these data in a second memory,
- reading out the content of the first memory line by line,
- for the first image element forming the contour within each line, setting a signal which is to be fed to the image reproduction device to a value formed by the data read out from the second memory, and
- for a second image element forming the contour within the same line in each case, resetting the signal which is to be fed to the image reproduction device.

According to an advantageous form of this development, in order to achieve unambiguity when reading out the coordinates of the contours and during the processing with the data which determine the colour, the coordinates are derived in such a way that the number of image elements forming the contour of each object is even within each line.

In order to ensure this even-numbered quality for any shapes of objects, provision can be made according to this development for sections of the contour which do not run in the direction of the lines to be formed from image elements at their end points and from one image element for each cut line, for sections of the contour which run in the direction of the lines to be formed from image elements at those ends which are situated at external corners of the object, and for individual image elements which are situated at the point of intersection of two sections of the contour which do not run in the direction of the lines and which form a corner of the object not to be written to the memory.

According to another advantageous form of this development, for the successive derivation of the coordinates, the fed-in data which contain the contour are fed in, the (X, Y) coordinates are temporarily stored for three successive timing cycles, two successive coordinates and two coordinates which are delayed by two timing cycles in relation to each other are compared in each case, and instructions for the modification, non-modification or setting of coordinates previously stored in the first memory are produced by a logical linkage of the comparison results.

If the graphic generator which supplies the data fed in is appropriately designed, it already generates the coordinates in the grid which is predetermined by address space of the image memory. However, it may be quite useful to employ a commercially available graphic generator, the resolution of which is higher than the resolution provided by the image memory and the image reproduction device, for example so that the coordinates fed in comprise ten bit positions compared with the eight bit positions of the coordinates which are finally determined by the image memory. It may then happen that the coordinates (with respect to the image memory) do not change from one output to the following one. In order to prevent faulty evaluation in this situation, provision is made according to another development for relaying of the temporary storage only to be effected if at least one of the coordinates alters from timing cycle to timing cycle.

It is only possible to obtain a provisional derivation of the first pair of coordinates, due to the lack of preceding comparison coordinates. In this further development, provision can therefore also be made that for the first data which are fed in coordinates are stored, independently of the logical linkage, which are corrected after the completion of a cycle around the object at this point.

For the graphical display of information, a rule of precedence is generally necessary for the objects or for the planes between their appearance in the foreground and in the background. With this development, this can be ensured by storing coordinates of the contours of a plurality of objects in the first memory, by determining a rule of precedence of planes in which the objects should be displayed with the storage in the second memory of the data which describe the colour of the objects, and by taking the rule of precedence into consideration on reading out the data from the second memory.

Memory components which are conventional in the art are suitable for carrying out this development of the procedure. In this respect, provision can be made according to one advantageous embodiment for storage of the coordinates to be effected by storing the coordinates of two image elements under an address representing one of the respective lines.

Depending on the particular requirements, however, another embodiment may be advantageous which consists of effecting storage of the coordinates by storing a 1-bit signal in an image memory in the element given by the respective coordinate.

The procedure according to the invention can be employed for displaying one or more objects in one plane and with one colour. However, it is also possible to display objects in a plurality of planes using the procedure according to the invention. In this other embodiment, each plane then merely requires an image memory one bit wide and a memory for the colour corresponding to the desired colour resolution. Since digital components are frequently designed for the processing of signals which are eight bits wide, eight planes can be processed particularly advantageously. Practically all applications can therefore be covered.

One advantageous embodiment of this development consists of effecting the logical linkage according to the following probability table:

| | |
|---|---|
| Y2 = Y1 & Y2 < Y3 & Y2 < X1 | non-inverting |
| Y2 = Y1 & Y2 > Y3 & X2 > X1 | non-inverting |
| Y2 < Y1 & Y2 = Y3 & X2 > X3 | non-inverting |
| Y2 > Y1 & Y2 = Y3 & X2 < X3 | non-inverting |
| Y2 < Y3 & Y2 = Y3 | non-inverting |
| Y2 > Y3 & Y1 = Y3 | non-inverting |
| Y2 = Y1 & Y2 < Y3 & X2 > X1 | inverting |
| Y2 = Y1 & Y2 > Y3 & X2 < X1 | inverting |
| Y2 < Y1 & Y2 = Y3 & X2 < X3 | inverting |
| Y2 > Y1 & Y2 = Y3 & X2 > X3 | inverting |
| Y2 < Y1 & Y2 > Y3 | inverting |
| Y2 > Y1 & Y2 < Y3 | inverting |
| Y1 = Y2 = Y3 & X2 < X1 & X2 > X3 | setting to "0" |
| Y1 = Y2 = Y3 & X2 > X1 & X2 < X3 | setting to "0" |
| Y1 = Y2 = Y3 & X2 > X1 & X2 > X3 | setting to "1" |
| Y1 = Y2 = Y3 & X2 < X1 & X2 < X3 | setting to "1" |

where X1, Y1 denote the following coordinates, X2, Y2 denote the current coordinates and X3, Y3 denote the preceding coordinates.

With this embodiment it is ensured, even for very complicated shapes of objects, that an even number of 1-bit signals occurs within one line. Complicated shapes of this type are present, for example, when an object has a point or constrictions.

Examples of embodiments of the invention are explained in more detail in the following description and are illustrated in the drawings with the aid of several Figures, where:

FIG. 4 illustrates a Table which is stored in a memory in the arrangement shown in FIG. 3;

FIG. 5 is a Table for explaining a memory in the device shown in FIG. 1;

Figure 10:
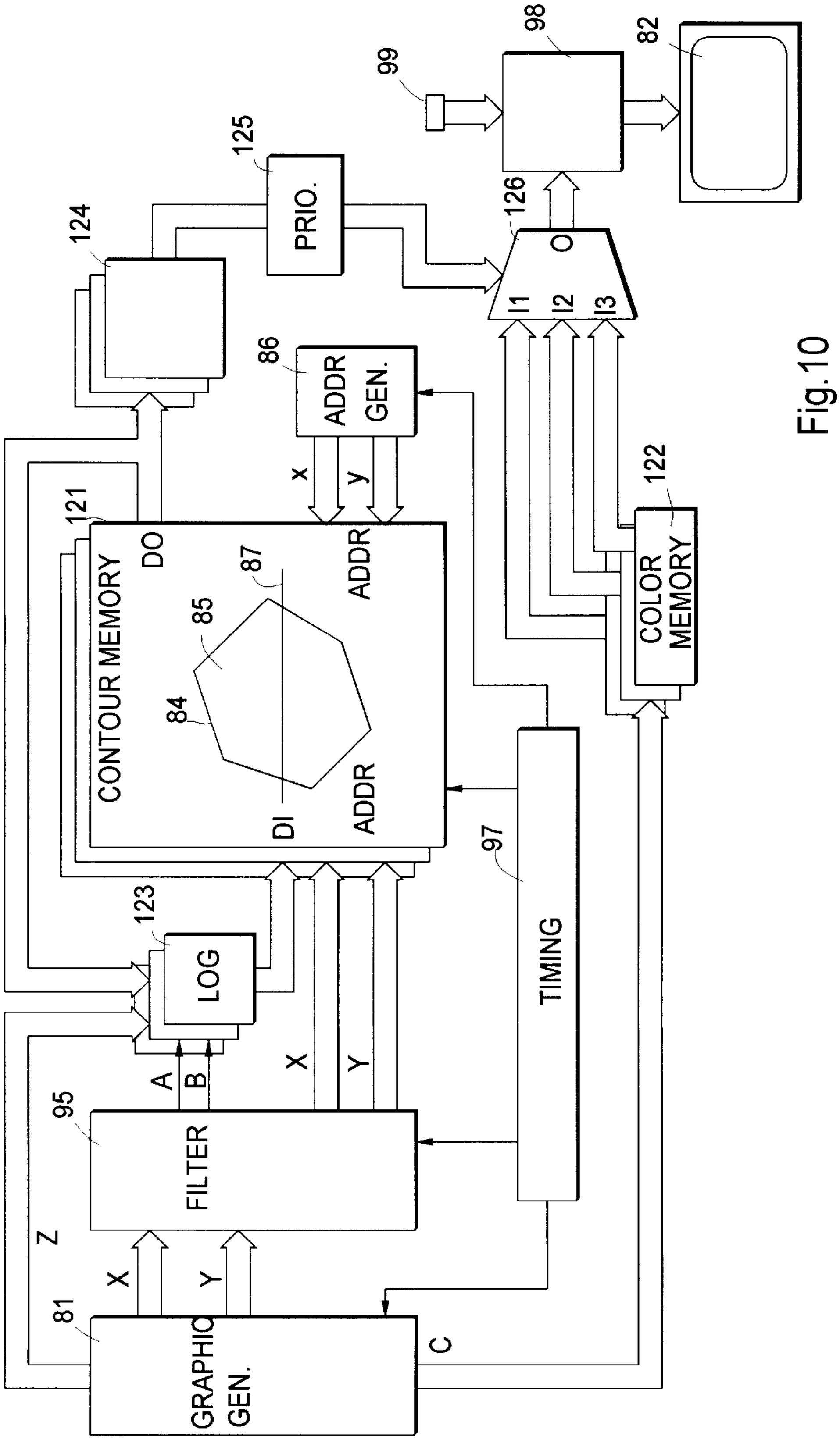
Figure 11:
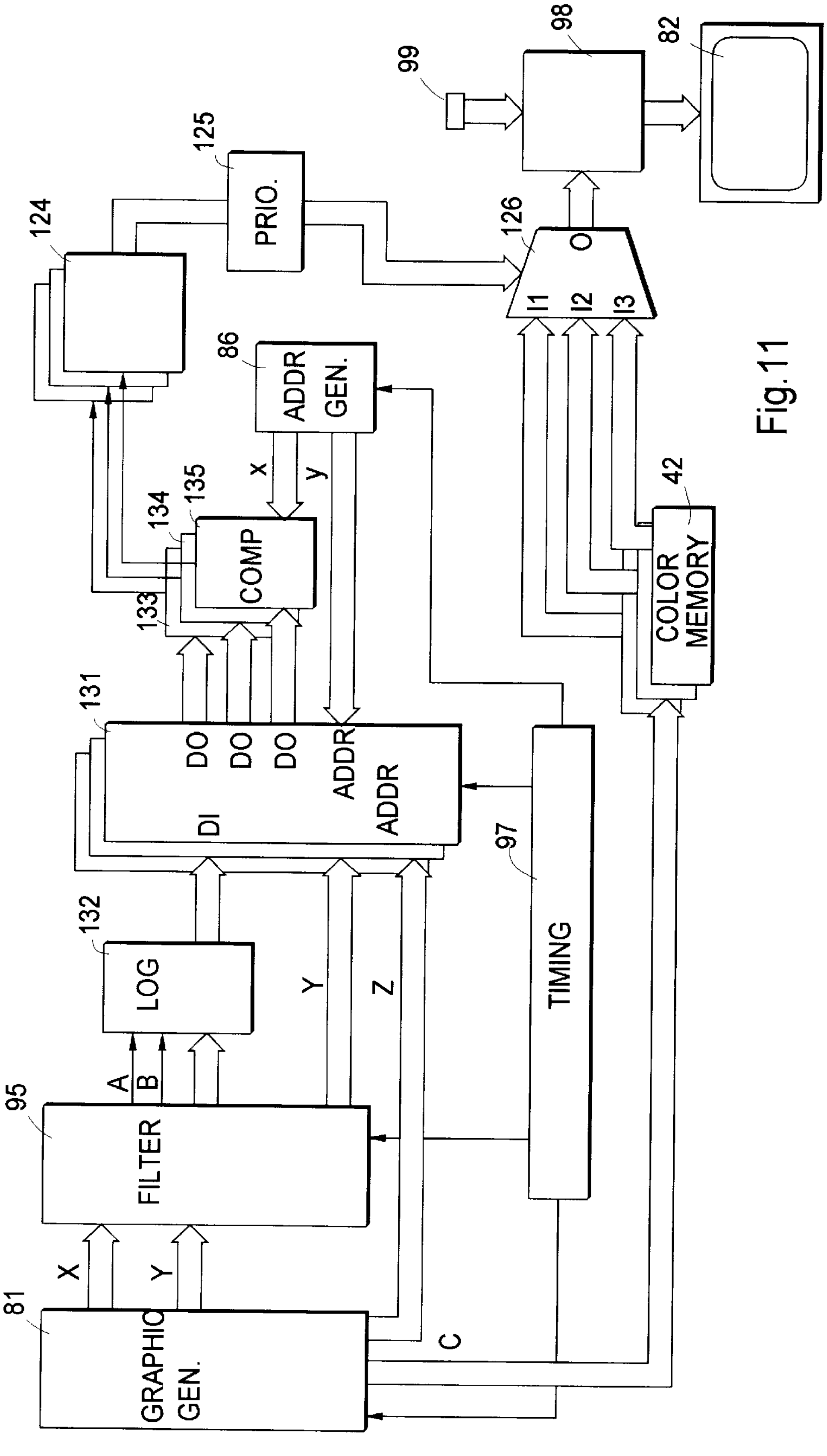

FIG. 9 comprises schematic illustrations showing the derivation of the 1-bit signals;

FIG. 10 is a block circuit diagram of a third arrangement for carrying out the procedure according to the invention; and FIG. 11 is a block circuit diagram of a fourth arrangement for carrying out the procedure according to the invention.

In the Figures, identical components are denoted by identical reference numerals. The embodiments exemplified and parts thereof are in fact illustrated as block circuit diagrams. However, this does not mean that the embodiments exemplified are restricted to a design which employs individual circuits corresponding to the blocks. Rather, the arrangements can be produced in a particularly advantageous manner with the aid of highly integrated circuits. In this connection, a digital signal processor can be used, which with suitable programming substantially performs the functions illustrated in the block circuit diagrams.

The bit widths of the individual signals which are given below have proved to be advantageous in a device according to the invention which was constructed in practice. Depending on the detailed requirements and on the possibilities of the technology employed in each case, other bit widths and signal formats may also be selected.

Figure 1:
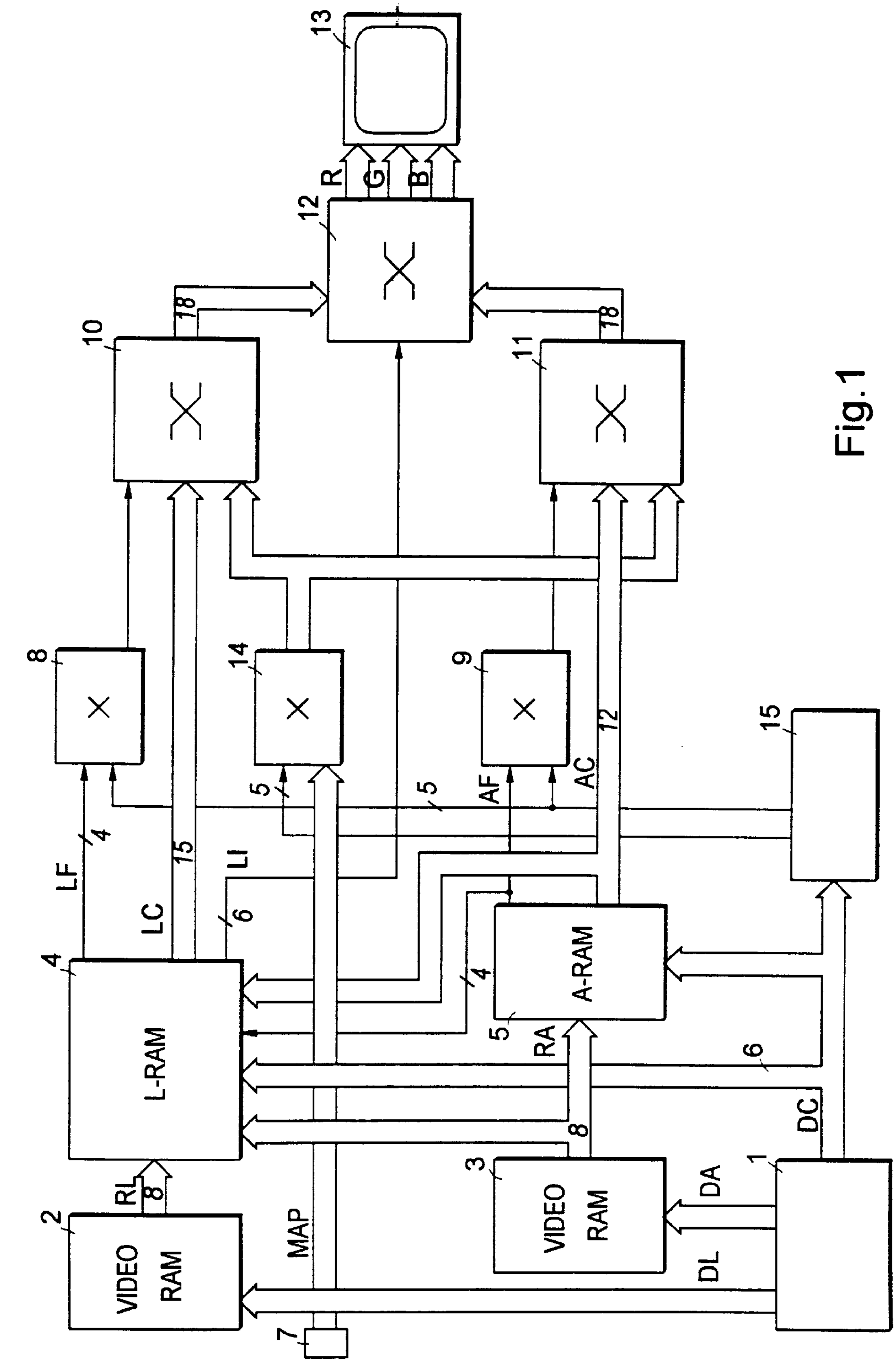
FIG. 1 is a block circuit diagram of a device according to the invention.

In the device shown in FIG. 1, a graphic processor which is known in the art generates graphic data DL and DA, which relate to lines and areas. In addition, control data DC, which are described later, are generated by the graphic processor 1. A video read-write memory (video RAM) 2, 3 is loaded with the data DL, DA in each case. Video memories of this type are designed for the storage of defined data for each image and for line by line read-out. Two memories, which can each be loaded and read out alternately, are frequently provided in video memories. Since video memories such as these, including their associated control circuits, can be obtained as component parts, a detailed description of the video memories 2, 3 is not necessary.

However, one special feature when using the video memory 3 within the scope of the device according to the invention is that one of the bit positions of the stored data is assigned in each case to a two-dimensional object which lies in one plane each time. For an object such as this, it is merely the presence for each image element or the spatial extent which is stored—but not the attribute thereof such as colour or transparency. For the sake of simplicity, colour, transparency and optionally intensity are also designated below as a property of an area or a line. Two-dimensional objects can therefore be displayed in eight different planes with the eight-bit wide signals RA which are read out from the video memory 3. A particularly advantageous procedure for generating the signals RA for the areas is described in German Patent Application P 44 46 783.4.

The signals RL and RA for the lines and the areas are each fed to a read-write memory 4, 5. On account of their assignment to the lines and areas, respectively, these memories are denoted as an L-RAM and an A-RAM in the drawing, but for the sake of simplicity are termed memory 4 and memory 5 in this description.

A line colour LC or an area colour AC and a line factor LF or an area factor AF are stored under an address in each case in memories 4 and 5, respectively. In addition, memory 4 also contains a line intensity LI for each address. The contents of the two memories 4, 5 can be loaded by the graphic processor 1 depending on the requirements; in detail, this can be effected for an operating phase as a whole or image by image via a data bus 6 which carries the control data DC.

The signals RL contain, in binary coded form, the information on which of the colours stored in memory 4 the respective line object should receive. The signals RL also comprise intensity information which is required for the subsequent suppression of foldover distortions.

A diverse variation of the display of two-dimensional objects which are given by signals RA is possible due to memory 5. Thus the colour of two-dimensional objects which do not overlap other objects can firstly be determined as desired. In this situation signals RA comprise a 1 in one bit position only. Any desired colour and any desired factor which are assigned to the respective object can be stored under this address in the memories.

If objects overlap, any "mixed colour" and any factor can be stored under each address which then occurs. For example, an address such as this may have the value 11001000 when objects are situated in planes 1, 2 and 5 for the image elements concerned in each case. In this situation, for example, one of the following colours can be stored in the memory 5:

the colour of the object in the first plane; this means that the object in the first plane is not transparent. The further objects are not visible behind the object in the first plane.

a natural mixed colour which would be produced, for example, when films printed with transparent objects are superimposed and are observed from the side of the incident light, so that subtractive colour mixing results. In this situation, for an overlap of the object in plane 1 with the colour yellow and of the object in plane 2 with the colour cyan and of the object in plane 5 with a non-transparent white a colour green would have to be stored in memory 5 for the aforementioned address, so that a substantially natural impression would be produced on reproduction.

The "mixed colour" can be determined in departure from calorimetric principles, for example as a warning colour when two objects overlap.

For each address, a further factor LF or AF is stored in memories 4, 5, respectively. These factors represent the transparency of the entire object, the colour of which is determined by signals LC and AC, in relation to a background signal MAP which is fed in at 7. These factors are fed via dimmer circuits 8, 9, which are explained below, to two faders 10, 11. It is thereby ensured in each case that, depending on the magnitude of the factor LF or AF, respectively, only the background signal MAP, a mixture of the background signal MAP and the respective colour LC or AC, or the colour LC or AC, respectively, on its own, is fed to the inputs of a further fader 12 by the faders 10, 11. The further fader 12 receives, as a control signal, the line intensity LI stored in memory 4. Amongst its other uses, the fading between the line colour and the area colour serves to eliminate foldover distortions. Six-bit wide digital colour value signals R, G, B can each be taken from the further fader 12 and fed to a reproduction device 13. The digital colour value signals R, G, B can also be converted into signals of other video standards.

The dimmer circuits 8, 9, as well as a further dimmer circuit 14, essentially consist of a multiplier which multiplies the line factor LF, the area factor AF and the background signal MAP fed in at 7 by a dimming factor in each case, wherein the dimming factors for the line factor and the area factor are the same in the embodiment illustrated, but can also be different. The dimming factors are written to a dimming register 15 by the graphic processor 1, via the bus system 6. Because it is no t the line colour LC or the area colour AC, but instead is the corresponding factors which are multiplied by the dimming factors, the brightness of the reproduced image can be controlled without the overall perception of the image being falsified and the recognisability of the individual objects thereby being reduced.

Figure 2:
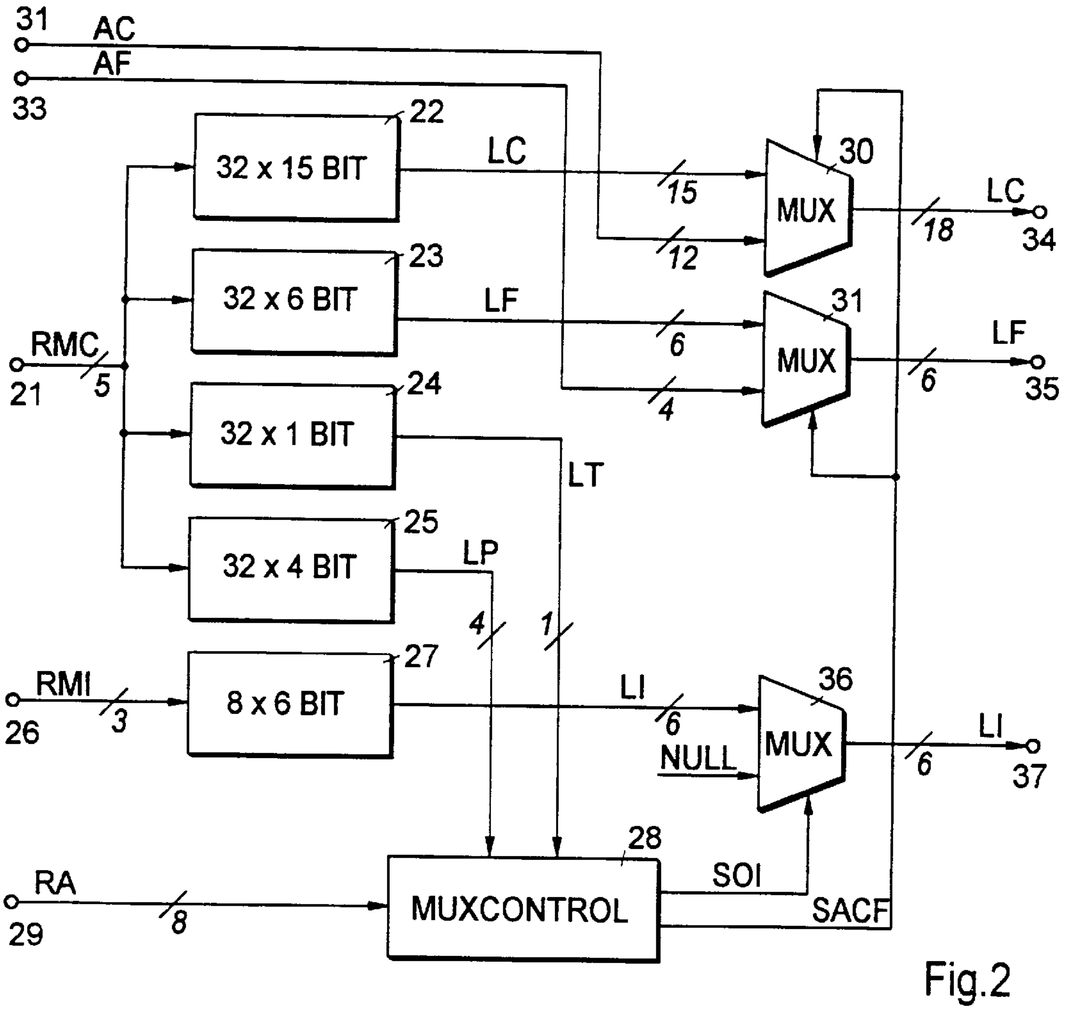
FIG. 2 is a more detailed illustration of a memory which is provided in the device shown in FIG. 1 for generating various data which relate to lines to be displayed.

FIG. 2 is a detailed illustration of memory 4. Eight-bit wide data RL (FIG. 1) from video memory 2 are divided up into five-bit wide data RMC and three-bit wide data RMI. In this connection, C denotes colour and I denotes intensity. The bit positions RMC which represent colour are fed via input 21 to the address inputs of four read-write memories 22, 23, 24, 25. The bit positions RMI representing the intensity are fed via an input 26 to address inputs of a further read-write memory 27. Read-write memories 22 to 25 and 27 can be loaded by the graphic processor 1 via the data bus 6 (FIG. 1) with the properties scheduled for the respective lines.

The memory arrangement illustrated in FIG. 2 also contains a multiplexer control circuit 28, which is controlled by signal RA from video memory 3 (FIG. 1) via an input 29. Details of the multiplexer control circuit 28 are explained in FIG. 3. For each value of the data RMC fed in at 21, a line colour is stored in memory 22 as a 15-bit wide value and a six-bit wide value is stored in memory 23 as a line factor. In addition, for each value of RMC the memory 24 contains a bit LT which indicates whether the respective line is intrinsically to be displayed transparently. In memory 25, a priority is stored for each value of RMC. This priority determines the rule of precedence with which the respective line is to be displayed between the foreground and the background. This four-bit wide signal LP, as well as the one-bit wide signal LT, are fed to the multiplexer control circuit 28. This four-bit wide signal LP, as well as the one-bit wide signal IT, are fed to the multiplexer control circuit 28.

The three-bit wide signal RMI serves to read out the signal LI (line intensity) from memory 27. The latter signal has a maximum in the middle of the lines and decreases to war ds the edges. Foldover distortions are then suppressed by the fade-over between line and area or background in the fader 12.

For various image contents it has proved advantageous to replace the properties of lines by properties of the areas adjoining the lines. For this purpose two multiplexers 30, 31 are provided in the device shown in FIG. 2, to which firstly the output signals of read-write memories 22 and 23 and secondly the area colour AC and the area factor AF can be fed from memory 5 (FIG. 1) via inputs 32, 33. The multiplexers 30, 31 are controlled by the multiplexer control circuit 28. The outputs 34, 35 of the multiplexers carry signals LC and LF.

A third multiplexer 36 serves to replace the line intensity LI by the value 0; this is also controlled by the multiplexer control circuit 28. Signal LI can be taken off at output 37.

Figure 3:
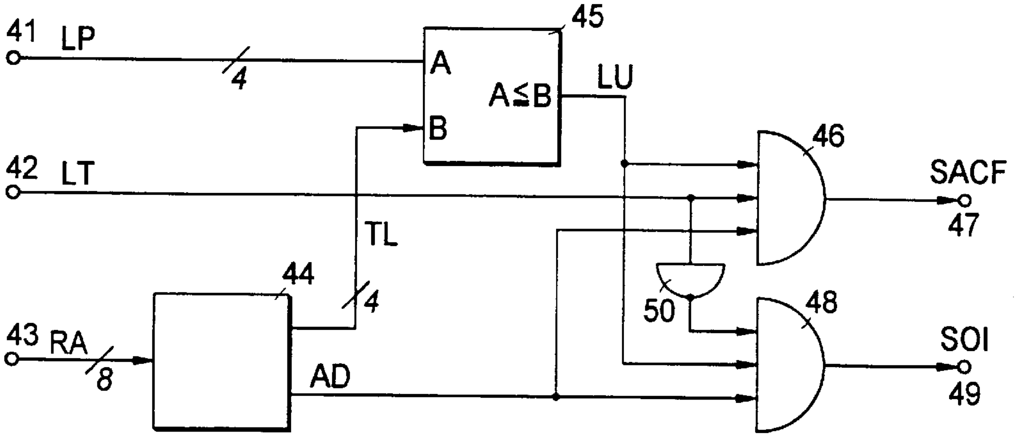
FIG. 3 shows a detail from the illustration of FIG. 2.

FIG. 3 is block circuit diagram of the multiplexer control circuit 28, to which signals LP and LT from memories 24, 25 are fed at 41 and 42. In addition, the multiplexer control circuit 28 receives signal RA from video memory 3 (FIG. 1) via an input 43. Two signals BL and AD are derived from signal RA with the aid of a table stored in a memory 44. The signal TL, which has a width of four bits, indicates the priority plane in which the object which is situated furthest towards the front in each case is situated. This signal is compared in a comparator 45 with the line priority LP. If the line priority is less than or equal to TL, the output signal LU (=lines underneath) is set to 1.

The further signal AD which is read out from the table 44 assumes the value 1 when an object is present in at least one plane. Signals LU and AD are fed, together with the signal LT (=lines transparent), to an AND gate 46. The output 47 of the AND gate carries a signal SACF which controls the multiplexers 30, 31 (FIG. 2) in such a way that, when the value of the signal SACF from the multiplexers 30, 31 is 1, signals AC and AF, and therefore the properties of the area, are fed as signals LC and LF to the outputs 34, 35 (FIG. 2) of the line memory. The condition which is imposed in this respect by means of the AND gate 46 is that an area must actually be present, that the line is underneath the area which is placed furthest towards the front, and that signal IT indicates transparency.

By means of a further AND gate 48, a signal SOI is derived which is taken off at the output 49 and is fed to the multiplexer 36 (FIG. 2). This signal sets signal LI (line intensity) to zero. It is generated by the AND operation at 48 (set equal to 1) if an area is actually present, if the respective line is underneath the area situated furthest towards the front, and if the area is not transparent. Signal LT is fed to the AND gate 48 via an inverter 50 for the latter.

FIG. 4 shows the table stored in the memory 44, namely the dependency of signals TL and AD on signal RA with bit positions (7) to (0) which is fed in. Signal TL denotes the highest priority plane in which an area is situated in each case. For example, if no area is present on the image element considered at the time considered, all the bit positions of signal RA, and signals TL and AD, are equal to 0. If an area is situated in the frontmost plane, which is represented by bit position (7) of signal RA, signal TL is 1000 and signal AD is 1, for example. It is then unimportant whether the areas are present in the planes situated further behind; this is represented in the table by an X.

In order to illustrate the function of memory 5 (FIG. 1), FIG. 5 shows a portion of a table which represents the content of the memory. As in the table shown in FIG. 4, the bit positions of signal RA serve as input quantities or addresses, so that a total of 256 memory spaces or lines of the Table illustrated in FIG. 5 are stored. For each address, a value of sign al AC (area colour) and of signal AF (area factor) is stored. The 12 bit positions of signal AC are divided into three colour values R, G, B such as red, green and blue.

Memory 5 is designed as a read-write memory to which any data can be fed under the addresses RA via the data bus 6 (FIG. 1). This can occur during the vertical frequency blanking-out interval, for example, so th at the properties of the objects can vary quasi-continuously. However, it is also possible to reload memory 5 each time if defined types of operation are set.

Line a of the table shown in FIG. 5 represents the case of an object situated in the frontmost plane, to which the colour red is assigned. There are no objects situated in the other planes. Line b represents the case of an object in plane 2, whilst line 3 shows an object in the third plane, the colour of which comprises proportions of both red and green. In the fourth line d, a portion of which is illustrated, the red object in the first plane and the object in the third plane overlap, for which a mixed colour with a higher proportion of red is provided.

A mixed colour such as this allows the object in the front plane in each case to appear transparent. If this is not to be the case, the colour of the object in the front plane is selected for the overlapping parts of the areas, which is illustrated in line e of FIG. 5, for example. A comparison with line b shows that despite the addition of the 1 in the third bit position the colour has not changed.

Signal AF is a measure of the transparency of the object as a whole, which object is represented in each case by signal AC. At the maximum value 1111 no transparency is present, in lines b and e for example. The objects according to lines a, c and d are semi-transparent, however. All entries in the table can be programmed independently of each other. For example, another mixed colour can thus be loaded (R, G, B in line d) without the colours of the object itself being altered.

Figure 6:
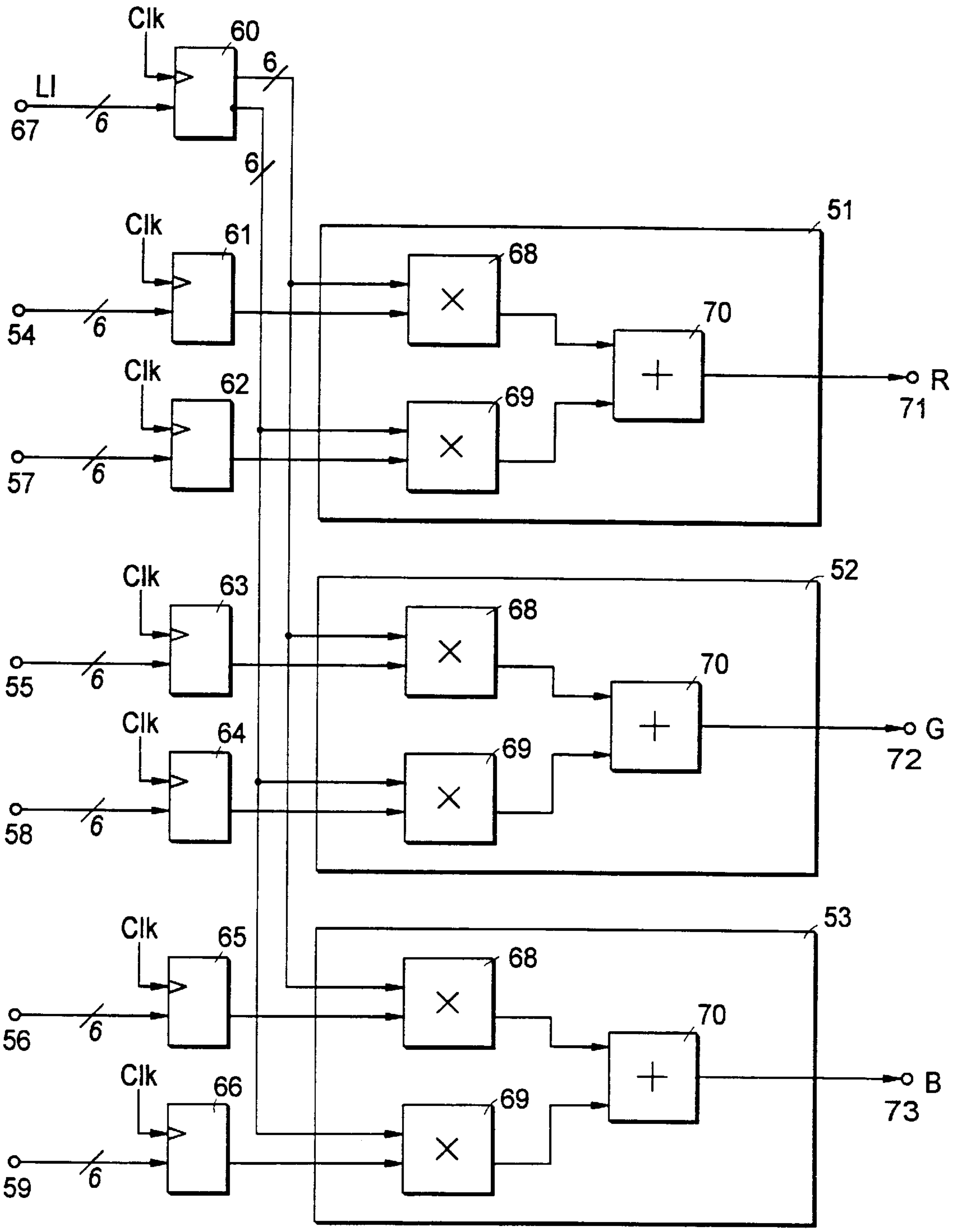
FIG. 6 is a detailed illustration of a fader which is provided in the device shown in FIG. 1.

FIG. 6 is a more detailed illustration of the fader 12 (FIG. 1). A fader 51, 52, 53 is provided for each colour value signal R, G, B. The six-bit wide output signals of fader 10 (FIG. 1) are fed to inputs 54, 55, 56. Inputs 57, 58, 59 each contain output signals of fader 11 which are six bit positions wide. Pairs of these signals which relate to the same colour are each written with a cycle Clk to one of the faders via registers 61 to 66. A further register 60 serves for the temporary storage and writing-in of the line intensity LI via input 67. Each of the faders 51, 52, 53 essentially consists of two multipliers 68, 69, to which firstly one of the input signals is fed and to which secondly the inverted or non-inverted signal LI is fed. Thus one input signal is multiplied by LI and the other input signal is multiplied by the unit complement of LI each time. The output signals of the multipliers 68, 69 are fed to an adder 70, the output 71, 72, 73 of which carries the signal R, G or B.

Figure 7:
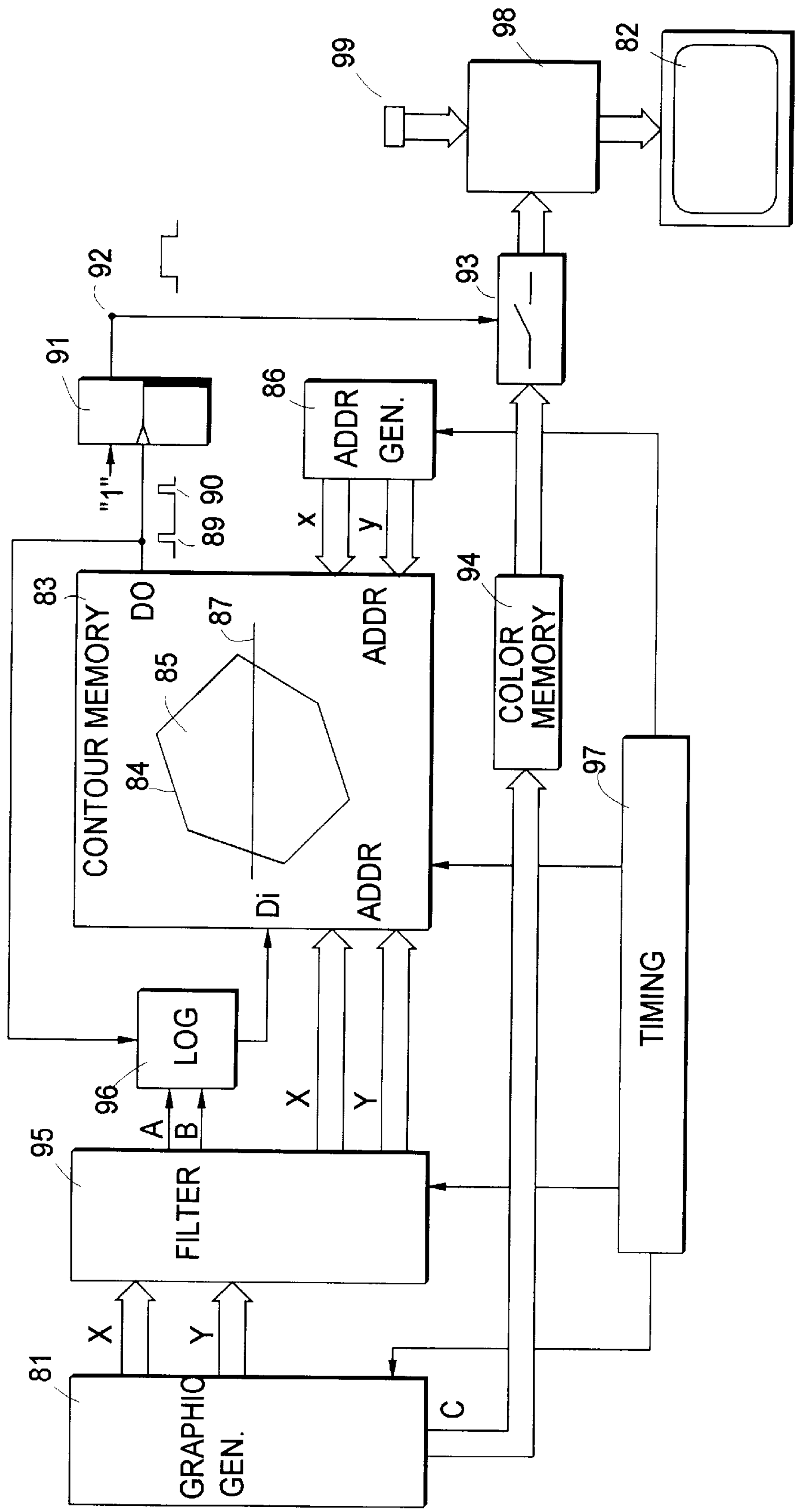
FIG. 7 is a block circuit diagram of another arrangement for carrying out the procedure according to the invention.

In the arrangement shown in FIG. 7 a graphic generator 81 is provided which calculates the X, Y coordinates of the points on the contour of an object to be displayed and outputs them in succession. In addition, data C are output which are valid for the object as a whole and which describe the colour of the object. In order to display the object by means of an image reproduction device 82 which periodically scans a line grid, an image memory 83 is provided which is hereinafter called a contour memory. The address space of this contour memory reflects the grid-like structure of the image with Ymax lines and Xmax image elements per line. The image memory 83 has inputs ADDR for addresses for writing and reading in each case, a data input DI and a data output DO.

In the contour memory 83 a bit can be stored under each address. In order to reproduce an object 85, those image elements which form the contour 84 of the object 85 are set to the value "1" corresponding to the X,Y coordinates generated by the graphic generator 81, whilst those on the image elements have the value "0". Thereafter, the contour memory 83 is read line by line, for which purpose x,y addresses are fed in from an address generator 86. A timing circuit 97 takes care of the chronological progress of the individual functions, particularly the write and read operations in the contour memory 83.

As will be described more precisely later in connection with FIG. 8, it is ensured that an even number of image elements is set to "1" in each line. When each line is read out, a signal which has two pulses 89, 90 for each line 87 which cuts the object 85 is generated at the output DO of the contour memory 83, as is indicated there. This signal triggers a D flip-flop 91, at the output of which a square pulse is present, the width and position of which represent the object in the respective line. During this period, the signal which is stored in a memory 94 (colour memory) and which represents the colour is fed to the image reproduction device 82 by a gate circuit 93. Further signals, which represent lines and characters for example, and which are fed in at 99, can be added to the signals generated with the procedure according to the invention in a circuit 98.

In order to ensure that only two 1-bit signals occur in each line 87 which cuts the object 85, a filter circuit 95 is provided which derives signals A and B from the X, Y coordinates fed in. These signals are fed to a logic circuit 96 which is connected to an input and an output of the contour memory. Reading, modification and re-writing is thereby possible for each image element. This has become known by the term read-modify-write.

If a new object 85 or a new phase of movement of the same object is written to the contour memory 83, the content of the contour memory is first deleted, namely all image elements are set to "0". The graphic generator thereupon commences the output of X, Y coordinates, from which firstly the X, Y addresses are derived and secondly signals A and B are generated in the filter circuit 95. With the aid of the logic circuit 96, these signals can leave the respective image element which is addressed unchanged, can invert it, set it to "0" (reset) or set it to "1" (set). During these events, the generation of square pulses at output 92 of the D flip-flop 91 can be prevented by the data input of the D flip-flop 91 being set to "0" by the timing circuit.

In the case of the contour memory, which has not been described previously (all bits=0), and without the risk of obtaining an odd number of 1-bit signals, the logic circuit 96 inverts the image elements situated on the contour. This is the situation for a vertical line, for example. However, a departure from this procedure is necessary, for example, for lines which are exactly horizontal, only the end points of which may be set to "1" so that the flip-flop 91 remains set during the entire line. Further operations are also necessary for corners, points and constrictions of the object, and are described below in connection with FIGS. 8 and 9.

Figure 8:
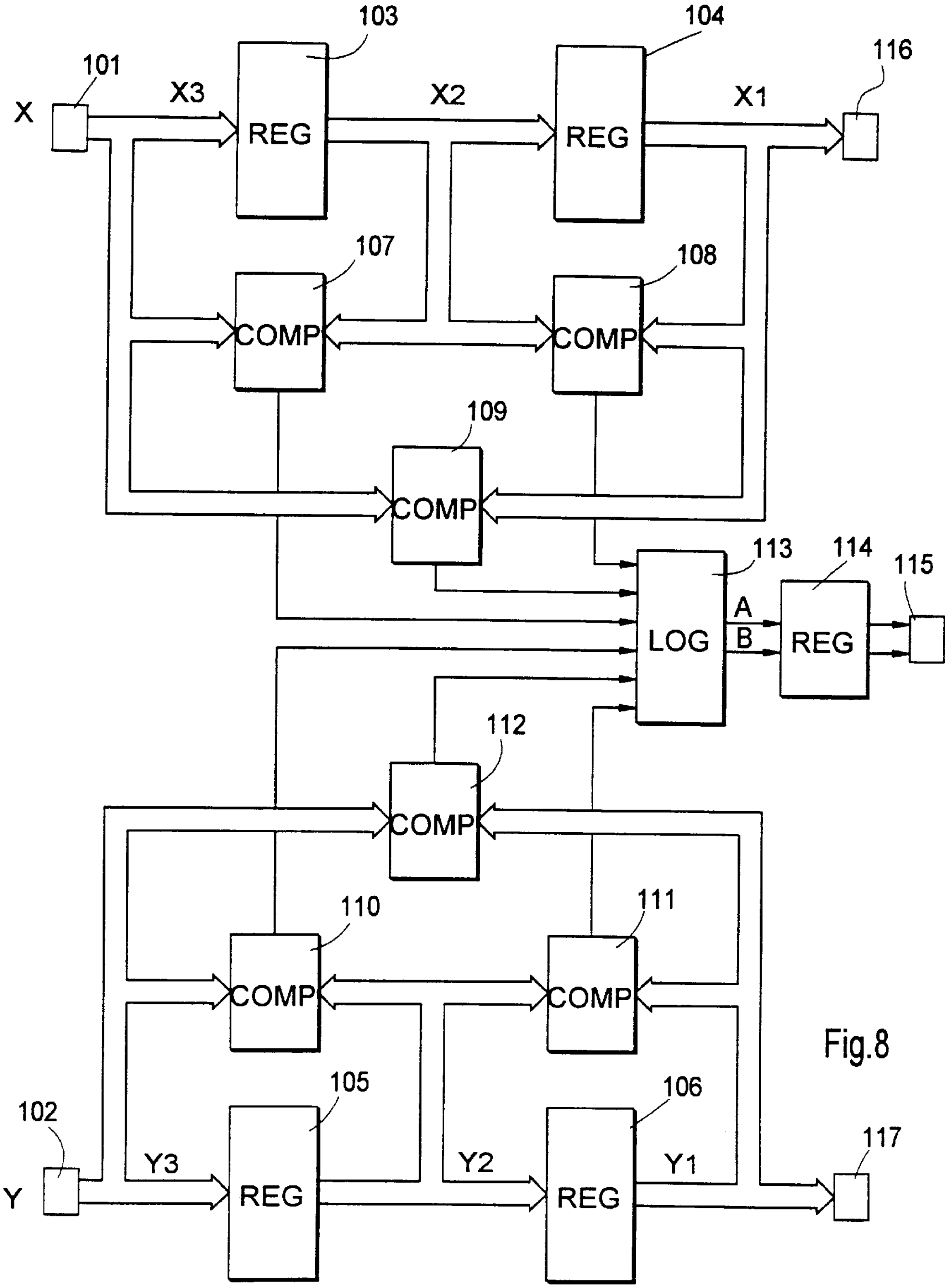
FIG. 8 illustrates a circuit for the logical linkage of a plurality of successive coordinates and for deriving the 1-bit signals.

FIG. 8 shows the filter circuit 95, to which the X and Y coordinates are fed at 101 and 102 from the graphic generator 1 (FIG. 7). The X coordinate is delayed by one timing cycle each time by means of two registers 103, 104 supplied with clock pulses, so that three X coordinates X1, X2, X3 which are obtained in succession are available simultaneously. The Y coordinates Y1, Y2, Y3 are generated in the same manner by means of registers 105, 106. X1, X2 and X3 are each compared with each other in pairs in comparators 107, 108, 109. A corresponding comparison of the Y components is made by means of comparators 110, 111, 112.

Each of the comparators generates output signals which denote three situations, namely that the signals at its inputs are equal, or that the first signal or the second signal is greater than the other signal in each case. These output signals are fed to a logic circuit 113 which forms statements for the derivation of the 1-bit signals corresponding to the probability table presented above—starting from a contour memory, the content of which is set to "0". Signals A and B are thereby generated, which are coded as follows, for example:

| statement | A | B |
|---|---|---|
| non-inverting (NI) | 0 | 0 |
| inverting (I) | 1 | 0 |
| set (S) | 1 | 1 |
| reset (R) | 0 | 1 |

Signals A and B are delayed by one timing cycle by means of a register 114 and are fed via an output 115 to the logic circuit 96 (FIG. 7). The associated X, Y coordinates can be taken off at further outputs 116, 117. Due to the delay by means of register 114, the signals at output 115 are in the chronological plane of the coordinates X2, Y2. In relation to an image element with these coordinates, the coordinates X1, Y1 constitute the preceding image element and the coordinates X3, Y3 constitute the following image element in each case.

On the evaluation by the filter 95 (FIG. 7) of the preceding coordinates and of the future coordinates to be fed in, various possibilities arise depending on the course of the contour in detail 64. This number of possibilities arises in that during the progressive formation, image element by image element, of the 1-bit signals, eight adjacent preceding image elements and eight future adjacent image elements in any combination have to be acquired in addition to the image point considered in each case.

Figure 9A:
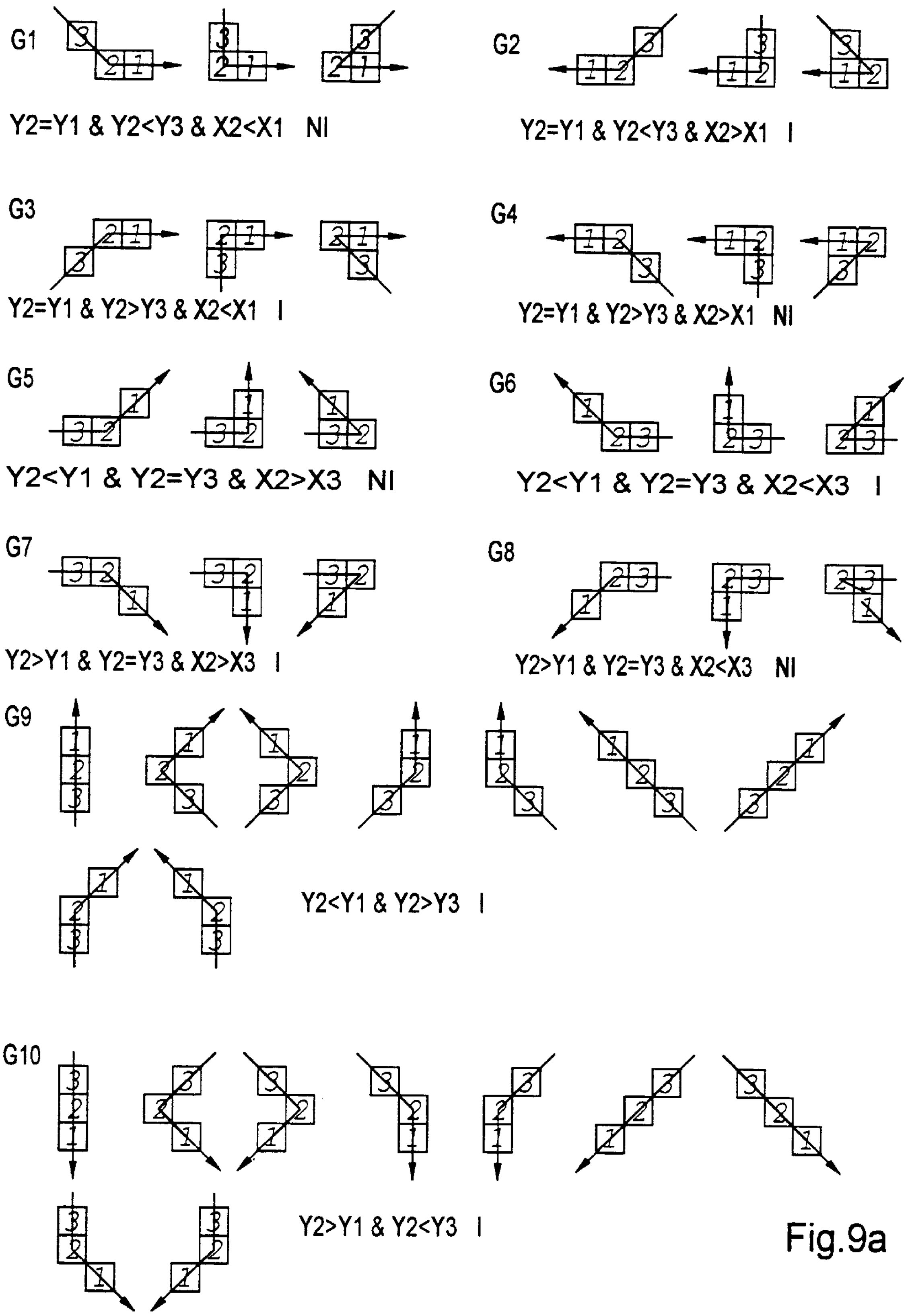
Figure 9B:
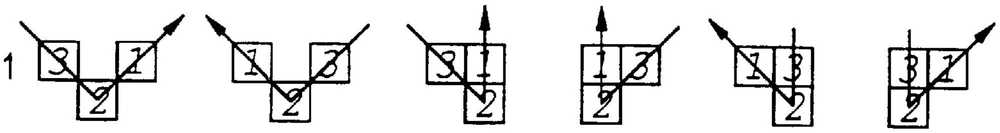
Figure 9B:
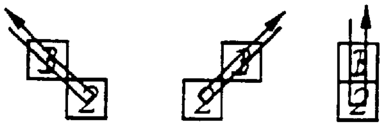
Figure 9B:
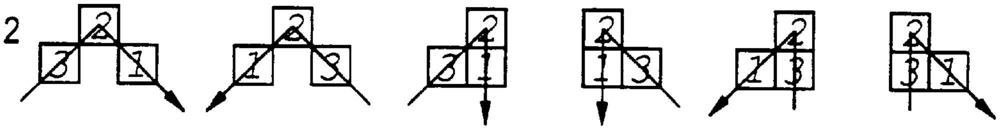
Figure 9B:
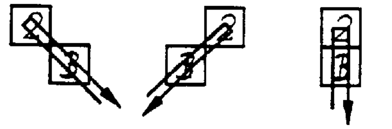
Figure 9B:
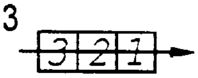
Figure 9B:
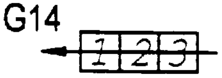
Figure 9B:
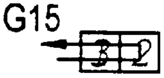
Figure 9B:

These 64 cases are schematically illustrated in FIGS. 9*a* and 9*b*, and are combined to form groups of cases for which the same condition is valid or for which the same output signals of the comparators (FIG. 8) are present in each case. The illustrations are based on a clockwise cycle around the object. The future, the present and the preceding image element is denoted in each case by italic FIGS. 1, 2, 3.

The cases of group G1 relate to internal corners at the right-hand edge of the object. The object area is therefore situated to the left of or below the image elements illustrated. The image element which is situated in the corner in each case is not inverted, i.e. a 1-bit signal is not stored for these coordinates. It is to be assumed that a 1-bit signal is already present or is still being generated in the same line at the left-hand edge of the object. However, the 1-bit signal which still remains for denoting the right-hand edge cannot be situated at this internal corner, since the contour is still progressing to the right.

The cases of group G2 each represent a corner situated at the bottom right, for which a 1-bit signal must be set. The same applies to the external corner situated at the top left according to group G3. Groups G4 and G5 again relate to internal corners, namely on the left side of the object. A 1-bit signal is not generated at these corners, i.e. the zeros which were previously written to the memory are not inverted. Groups G6 and G7 again relate to external corners, namely to those at the left-hand and right-hand edge of the object, so that an inversion of the image element is effected. The cases of group G8 are again internal corners, where no inversion is effected.

In group G9, all the cases are combined in which the linked coordinates are in ascending order, whilst in the cases of group G10 the linked coordinates are processed descending at the right hand edge of the object. In all cases only one image element which is inverted occurs for each line.

The cases of groups G11 and G12 are characterised in that the vertical component of the direction of processing is reversed at the present image element. This image element would result in an odd-numbered quality in the respective line and is therefore not inverted.

The cases of groups G13 and G14 are parts of sections of the contour which run in the direction of the lines, where no 1-bit signals are to be set for the image elements situated inside the end points. The present image element is therefore reset in both cases.

The cases of groups G15 and G16 relate to end points of a horizontally extending line or point of an object, at which the direction of processing is reversed. It is therefore necessary to set a 1-bit signal.

With the arrangement shown in FIG. 7 it is possible to display an object 85 using the image reproduction device 82. In many specific applications, however, a plurality of objects has to be displayed simultaneously. In the arrangement shown in FIG. 10 a contour memory 121 is provided for this purpose, in which each item of information comprising a plurality of bits can be stored under an address. Compared with contour memory 83 (FIG. 7), contour memory 121 has a plurality of planes. Since eight-bit words (bytes) are frequently used in digital technology, memories with eight planes are easily produced or obtainable. Thus the contours of eight different objects can be stored in contour memory 121, and the colours of these objects can be stored in an eight-fold colour memory 122.

More or less than eight planes can also be provided, however, according to the requirements in the particular case. For the sake of clarity, only three planes are indicated in FIG. 10. A logic circuit 123 and flip-flops 124 are of multiple design corresponding to the number of planes. A single arrow pointing towards the middle plane means that signals are fed to all planes. If different signals are intended for the individual planes, a plurality of arrows which point towards different planes is illustrated.

The contours of the individual objects are written to the contour memory 121 sequentially, for which purpose, during a period in which the X, Y coordinates and the colour C for a first object are output, the logic circuit 123 is controlled by the graphic generator in such a way that a modification of the 1-bit signals in the read-modify-write cycle is only effected in that bit of a byte which is read out from contour memory 121 under the address corresponding to the coordinates, which bit belongs to the plane of the respective object. If the contour of an object is written to the associated plane of memory 121, the data output for the second object is effected by the graphic generator 81, whereupon only the bits belonging to the second object are then processed in the logic circuit 123.

Read-out of the contours is effected in such a way that the entire byte is read out under an x, y address in each case and is distributed to the inputs of flip-flop 124. Square signals are then available line by line at the outputs of flip-flop 124, corresponding to the position and width of the object on the respective line.

These signals are fed to a priority circuit 125 in which the signals are transmitted or suppressed in accordance with an established priority. For example, as long as the signal with the highest priority has the level "1", which is the situation inside the area of the object, all other signals are set to level "0" irrespective of their input value. A display of the individual objects in a plurality of planes between the observer and the background is thereby possible. When there are overlaps, the front object in each case covers the one behind. Suitable priority circuits, which essentially consist of logic elements, are obtainable commercially, so that a detailed description of priority circuit 125 is unnecessary.

A multiplexer 126 is controlled by the output signals of priority circuit 125 in such a way that signals at one of its inputs I1, I2, I3 are each transmitted to output O. Inputs I1, I2, I3 of the multiplexer each contain signals from a plane of the colour memory 122. In the arrangement shown in FIG. 7, output O of multiplexer 126 is connected to the image reproduction device 82 via a circuit 98.

In the arrangement illustrated in FIG. 11 the contour memory 131 is of different construction to the contour memories 83, 121 in the arrangements shown in FIGS. 7 and 10. For the storage of one of the image elements forming the contour, a 1-bit signal is not stored under the address corresponding to the coordinates, but instead the X coordinates of two image elements which form the contour and which are situated on a line are each stored under a Y address which denotes this line. This is again effected for the contours of a plurality of objects, with regard to which three planes are illustrated in FIG. 11 but represent an arbitrary number of planes.

The object to which the X coordinates which are fed to the memory in each case belong is again communicated by the graphic generator 81 as quantity Z. This is fed, together with Y, to an address input ADDR of contour memory 131, so that the address under which the two X coordinates are stored comprises the information: line Y, plane Z. So that only two image elements in each line are marked as belonging to the contour, a filter 95 is likewise provided in the arrangement shown in FIG. 11. The X coordinates leaving this filter are processed with the aid of signals I and S in a logic circuit 132, in a similar manner to the 1-bit signals in the embodiments illustrated in FIGS. 7 and 10. Depending on its relationship to the cases illustrated in FIG. 9, an X coordinate is either re-written, deleted or over-written by another.

In order to read out the signals describing the contours from contour memory 131, the x, y coordinates are generated by the address generator 85, as for the other embodiments exemplified, in such a way that during a line y the addresses or x coordinates of all the image elements in a line are generated in succession. Contour memory 131 is constructed in such a way that when it is read the data stored under the respective address part y in all planes Z are read out simultaneously. The data read out from each plane are each compared with x in a comparator 133, 134, 135. If the value x reaches one of the X coordinates which are stored for one line and one plane in each case, equality is determined in the respective comparator 13, 134, 135 and a pulse is emitted for the duration of this timing cycle. These pulses are then processed further as described with reference to FIGS. 7 and 10 in connection with the other embodiments exemplified.

We claim:

1. A method for displaying objects using an image reproduction device with a raster of scanlines, comprising the steps of:

(a) inputting data from a graphic processor which contain coordinates of successive points of contours (border lines) of the objects;

(b) deriving from the coordinates of the points an even number of contour image elements per scanline, including the case of overlapping objects;

(c) storing the contour image elements in at least one memory by setting data at addresses which correspond to locations of the contour image elements to predetermined values;

(d) inputting and storing in at least one further memory further data which describe colors, there being one color assigned to each object, each of which colors extends over the entire object;

(e) reading out the data of the contour image elements scanline by scanline from the at least one memory;

(f) changing the read out data by setting the data of image elements between two contour image elements to said predetermined values;

(g) supplying the changed data as addresses to the at least one further memory; and (h) reading out the further data under the addresses from the at least one further memory as digital video signals which are fed to the image reproduction device.

2. The method according to claim 1, wherein the digital video signals are mixed with further digital video signals which are fed in.

3. The method according to claim 1, wherein data which describe the shape and position of line objects are stored in a first image memory and data which describe the shape and position of two-dimensional objects are stored in a second image memory, and wherein the data read out from the first and second image memories are fed as addresses to a first and a second further memory in each case.

4. The method according to claim 3, wherein the data which describe the shape and position comprise a plurality of bit positions for each image element and each bit position is assigned to a display plane, particularly to an object to be displayed in this display plane.

5. The method according to claim 4, wherein the data which describe the shape and position comprise a plurality of bit positions for each image element, wherein a bit position is assigned to each display plane, particularly to an object to be displayed in this display plane, wherein signals which can be taken from the first further memory and which indicate the plane of the respective line object are compared with the data read out from the second image memory, and wherein the digital video signals representing the lines are replaced by digital video signals which represent objects for those image elements for which the comparison shows that a line runs behind an object.

6. The method according to claim 1, wherein the transparency of the objects is additionally stored in the at least one further memory.

7. The method according to claim 3, wherein digital video signals which relate to the line objects and digital video signals which represent the color of the two-dimensional objects are each mixed with a background signal using a transparency factor, and that the mixed products are mixed with each other using a further factor which describes the line intensity.

8. The method according to claim 7, wherein the factor which describes the line intensity falls off gradually from the middles of the lines to their edges in order to avoid foldover distortions.

9. The method according to claim 1, wherein the color and transparency of an object or of a combination of a plurality of overlapping objects are stored in the at least one further memory under an address in each case.

10. The method according to claim 1, wherein the further data for each address can be independently fed in and stored in the further memories.

11. A method for displaying objects using an image reproduction device with a raster of scanlines, comprising the steps of:

(a) inputting data from a graphic processor which contain coordinates of successive points of contours (border lines) of the objects;

(b) deriving from the coordinates of the points an even number of contour image elements per scanline whether or not an object is hidden by another, overlapping object;

(c) storing the contour image elements in at least one memory by storing addresses which correspond to locations of the contour image elements;

(d) inputting and storing in at least one further memory further data which describe colors, there being one color assigned to each object, each of which colors extends over the entire object;

(e) comparing inputted addresses which are incremented according to the raster of scanlines to the stored addresses resulting in data which are set to a predetermined level when the incremented addresses correspond to the addresses of the contour image elements or the image elements between two of the contour image elements in the same scanline;

(f) supplying the resulting data as addresses to the at least one further memory; and (g) reading out the further data under the addresses from the at least one further memory as digital video signals which are fed to the image reproduction device.

12. The method according to claim 11, wherein the coordinates are derived in such a way that the number of image elements forming the contour of each object is even within each line.

13. The method according to claim 12, wherein sections of the contour which do not run in the direction of the lines are formed from image elements at their end points and from one image element for each cut line, that sections of the contour which run in the direction of the lines are formed from image elements at those ends which are situated at external corners of the object, and that individual image elements which are situated at the point of intersection of two sections of the contour which do not run in the direction of the lines and which form a corner of the object are not written to the image memory.

14. The method according to claim 13, wherein for the successive derivation of the coordinates, the fed-in data which contain the contour are fed in, that the (X, Y) coordinates are temporarily stored for three successive timing cycles, that two successive coordinates and two coordinates which are delayed by two timing cycles in relation to each other are compared in each case, and that instructions for the modification, non-modification or setting of coordinates previously stored in the first memory are produced by a logical linkage of the comparison results.

15. The method according to claim 14, wherein relaying of the temporary storage is only effected if at least one of the coordinates alters from timing cycle to timing cycle.

16. The method according to claim 14, wherein for the first data which are fed in coordinates are stored, independently of the logical linkage, which are corrected after the completion of a cycle around the object at this point.

17. The method according to claim 11, wherein coordinates of the contours of a plurality of objects are stored in the image memory, wherein, with the storage in the further memory of the data which describe the color of the objects, a rule of precedence of planes in which the objects should be displayed is determined, and wherein the rule of precedence is taken into consideration on reading out the data from the further memory.

18. The method according to claim 11, wherein storage of the coordinates is effected by storing the coordinates of two image elements under an address representing one of the respective lines.

19. The method according to claim 11, wherein storage of the coordinates is effected by storing a 1-bit signal in the image memory in the element given by the respective coordinate.

20. The method according to claim 19, wherein the logical linkage is effected according to the following Boolean operation table:

| | |
|---|---|
| Y2 = Y1 & Y2 < Y3 & Y2 < X1 | non-inverting |
| Y2 = Y1 & Y2 > Y3 & X2 > X1 | non-inverting |
| Y2 < Y1 & Y2 = Y3 & X2 > X3 | non-inverting |
| Y2 > Y1 & Y2 = Y3 & X2 < X3 | non-inverting |
| Y2 < Y3 & Y2 = Y3 | non-inverting |
| Y2 > Y3 & Y1 = Y3 | non-inverting |
| Y2 = Y1 & Y2 < Y3 & X2 > X1 | inverting |
| Y2 = Y1 & Y2 > Y3 & X2 < X1 | inverting |
| Y2 < Y1 & Y2 = Y3 & X2 < X3 | inverting |
| Y2 > Y1 & Y2 = Y3 & X2 > X3 | inverting |
| Y2 < Y1 & Y2 > Y3 | inverting |
| Y2 > Y1 & Y2 < Y3 | inverting |

* * * * *